(12) United States Patent
van den Berg et al.

(10) Patent No.: US 8,526,268 B2
(45) Date of Patent: *Sep. 3, 2013

(54) METHOD FOR DEGHOSTING AND WATER LAYER MULTIPLE REFLECTION ATTENUATION IN MARINE SEISMIC DATA

(75) Inventors: Peter M. van den Berg, The Hague (NL); Jacob T. Fokkema, Schiedam (NL)

(73) Assignee: PGS Americas, Inc., Houston, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/804,989

(22) Filed: Aug. 2, 2010

(65) Prior Publication Data

US 2011/0058450 A1   Mar. 10, 2011

Related U.S. Application Data

(62) Division of application No. 11/124,448, filed on May 5, 2005, now Pat. No. 7,768,869.

(51) Int. Cl.
*G01V 1/38* (2006.01)
(52) U.S. Cl.
USPC .......................................................... 367/24
(58) Field of Classification Search
USPC ..................................................... 367/24, 21
See application file for complete search history.

(56) References Cited

U.S. PATENT DOCUMENTS

| | | | |
|---|---|---|---|
| 4,486,865 A | 12/1984 | Ruehle | |
| 4,752,916 A | 6/1988 | Lowenthal | |
| 4,935,903 A | 6/1990 | Sanders et al. | |
| 4,979,150 A | 12/1990 | Barr | |
| 5,581,514 A | 12/1996 | Moldoveanu et al. | |
| 5,621,700 A | 4/1997 | Moldoveanu | |
| 6,477,470 B2 * | 11/2002 | Fokkema et al. | 702/17 |
| 6,654,694 B2 | 11/2003 | Fokkema et al. | |
| 6,704,244 B1 * | 3/2004 | Vaage | 367/24 |
| 6,747,913 B2 | 6/2004 | Fokkema et al. | |
| 7,123,543 B2 * | 10/2006 | Vaage et al. | 367/24 |
| 7,768,869 B2 * | 8/2010 | van den Berg et al. | 367/24 |
| 2005/0117451 A1 * | 6/2005 | Robertsson | 367/24 |
| 2006/0050611 A1 * | 3/2006 | Borresen | 367/24 |

FOREIGN PATENT DOCUMENTS

| | | |
|---|---|---|
| GB | 2375606 | * 11/2002 |
| GB | 2 394 051 | 4/2004 |
| GB | 2 410 551 | 8/2005 |
| WO | WO 0057207 | 9/2000 |
| WO | WO 03100461 | 12/2003 |

OTHER PUBLICATIONS

J.W. Schoolmeesters, 2001, "Three-Dimensional Processing of Marine Seismic Data by spectral Decomposition", PhD. Thesis, Title Page, Table of Contents, Section 4.2.2., ISBN 90-0914856-6, Delft University of Technology, Delft, Netherlands, pp. 63-66.

(Continued)

*Primary Examiner* — Ian J Lobo (57) ABSTRACT

A method is disclosed for deghosting and water surface multiple reflection attenuation in marine seismic data. The method includes decomposing data acquired at two water depths with sensors that measure the same parameter into upgoing and downgoing wavefield components. The decomposing includes, in one embodiment, transforming the data into the spatial Fourier domain and separating the upgoing and downgoing wavefield components in the transformed data. A substantially multiple-free wavefield is then determined from the decomposed wavefield components.

14 Claims, 3 Drawing Sheets

(56) References Cited

OTHER PUBLICATIONS

B.J. Posthumus; "Deghosting Using a Twin Streamer Configuration", 1993; Geophysical Prospecting 41, pp. 267-286.

Lasse Amunsden, 2001, "Elimination of free-surface, related multiples without need of the source wavelet", Geophysics, vol. 66, No. 1, pp. 327-341.

* cited by examiner

METHOD FOR DEGHOSTING AND WATER LAYER MULTIPLE REFLECTION ATTENUATION IN MARINE SEISMIC DATA

CROSS-REFERENCE TO RELATED APPLICATIONS

This application is a divisional application of, and claims priority from, U.S. Nonprovisional patent application Ser. No. 11/124,448 filed on May 5, 2005, now U.S. Pat. No. 7,768,869 the entirety of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration. More specifically, the invention relates to methods for acquiring and processing seismic data.

2. Background Art

In seismic exploration, seismic data are acquired by imparting acoustic energy into the earth near its surface, and detecting acoustic energy that is reflected from boundaries between different layers of subsurface earth formations. Acoustic energy is reflected when there is a difference in acoustic impedance between adjacent layers to a boundary. Signals representing the detected acoustic energy are interpreted to infer structures and composition of the subsurface earth structures.

In marine seismic exploration, a seismic energy source, such as an air gun or air gun array, is typically used to impart the acoustic energy into the earth. The air gun or array is actuated at a selected depth in the water while the air gun or array is towed by a vessel. The same or a different vessel tows one or more seismic sensor cables, called "streamers", in the water. Generally the streamer extends behind the vessel along the direction in which the streamer is towed. Typically, a streamer includes a plurality of hydrophones disposed on the cable at spaced apart, known positions along the cable. Hydrophones, as is known in the art, are sensors that generate an optical or electrical signal corresponding to the pressure of the water or the time gradient (dp/dt) of pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Typically, in order to develop a more accurate representation of the earth's subsurface, data processing techniques are utilized to attenuate the affects of ghosting and water layer multiple reflections in the seismic data. Ghosting and water layer multiple reflections, arise because water has substantially different acoustic impedance from the air above the water surface, and water typically has a substantially different acoustic impedance from the earth formations at the bottom of the water (or sea floor).

Ghosting and water layer multiples can be understood as follows. When the air gun or air gun array is actuated, the downwardly radiating acoustic energy passes through the sea floor and into the subsurface earth formations. Some of the acoustic energy is reflected at subsurface acoustic impedance boundaries between layers of the earth formations, as previously explained. Reflected acoustic energy travels generally upwardly, and is ultimately detected by the seismic sensors (hydrophones) on the one or more streamers. After the reflected energy reaches the streamers, however, it continues to travel upwardly until it reaches the water surface. The water surface has nearly complete reflectivity (reflection coefficient equal to unity) with respect to the upwardly traveling acoustic energy. Therefore, nearly all the upwardly traveling acoustic energy will reflect from the water surface, and travel downwardly once again. The water-surface reflected acoustic energy will also be shifted in phase by about 180 degrees from the upwardly traveling incident acoustic energy. The surface-reflected, downwardly traveling acoustic energy is commonly known as a "ghost" signal. The ghost signal causes a distinct "notch", or attenuation of the energy within a limited frequency range, in the acoustic energy detected by the hydrophones. The notch is centered about a frequency in the detected acoustic signal related to the selected depth at which the streamer is disposed, as is well known in the art.

The downwardly traveling acoustic energy reflected from the water surface, as well as acoustic energy emanating directly from the seismic energy source, may reflect from the water bottom and travel upwardly, where it is detected by the hydrophones. This same upwardly traveling acoustic energy will also reflect from the water surface, once again traveling downwardly. Acoustic energy may thus reflect from both the water surface and water bottom a number of times before it is attenuated, resulting in so-called water layer reverberations. Such reverberations can have substantial amplitude within the total detected acoustic energy, masking the acoustic energy that is reflected from subsurface layer boundaries, and thus making it more difficult to infer subsurface structures and compositions from seismic data.

It is known in the art to provide a so-called "dual sensor" cable for detecting acoustic (seismic) signals for certain types of marine seismic surveys. One such cable is known as an "ocean bottom cable" (OBC) and includes a plurality of hydrophones located at spaced apart positions along the cable, and a plurality of substantially collocated geophones on the cable. The geophones are responsive to the velocity of motion of the medium to which the geophones are coupled. Typically, for OBCs the medium is the water bottom or sea floor. Using signals acquired using dual sensor cables enables particularly useful forms of seismic data processing. Such forms of seismic data processing generally make use of the fact that the ghost signal is substantially opposite in phase to the acoustic energy traveling upwardly after reflection from subsurface layer boundaries. The opposite phase of the ghost reflection manifests itself in the measured signals by having opposite sign or polarity in the ghost signal as compared with upwardly traveling acoustic energy in the signals measured by the hydrophones. Because geophones are sensitive to the direction of signal propagation as well as the phase, the polarity of the signal detected by the geophones will be the same for the upwardly traveling acoustic energy and for the downwardly traveling acoustic energy.

The foregoing relationship between polarities of upgoing and downgoing acoustic energy has led to a number of "deghosting" and water layer effect attenuation techniques. One such technique is described in U.S. Pat. No. 4,486,865 issued to Ruehle. Pairs of detectors each comprise a geophone and a hydrophone. A filter is applied to the output of at least one of the geophone or hydrophone in each pair so that the frequency content of the filtered signal is adjusted. The adjustment to the frequency content is such that when the filtered signal is combined with the signal from the other sensor, the ghost reflections cancel.

U.S. Pat. No. 5,621,700 issued to Moldoveanu also discloses using at least one pair of sensors in a method for attenuating ghosts and water layer reverberations.

U.S. Pat. No. 4,935,903 issued to Sanders et al. discloses a method for reducing the effects of water layer reverberations which includes measuring pressure at vertically spaced apart depths, or by measuring pressure and particle motion using sensor pairs. The method includes enhancing primary reflection data for use in pre-stack processing by adding ghost data.

U.S. Pat. No. 4,979,150 issued to Barr discloses a method for marine seismic exploration in which output of substantially collocated hydrophones and geophones are subjected to a scale factor. It is said that the collocated hydrophones and geophones can be positioned at the sea floor or above the sea floor.

Most techniques known in the art for deghosting and multiple attenuation are intended for use with OBCs. It is desirable to be able to deghost and attenuate water layer multiples in signals acquired using streamer-type cables towed by a vessel. Using streamers is particularly desirable because moving a streamer from one location to another is much less time consuming and much less difficult than moving an OBC. Further, it is desirable to have a method for deghosting and multiple attenuation which is relatively insensitive to the water depth at which the streamer is positioned (towed), is relatively insensitive to undulations in the water surface, and for which knowing the energy source "wavelet" (acoustic signature) beforehand is unnecessary.

Other patents which discloses methods related to the subject matter of the present invention include the following:

J. T. Fokkema and P. M. van den Berg, Method and System for Deghosting, U.S. Pat. No. 6,477,470, issued Nov. 5, 2002; J. T. Fokkema and P. M. van den Berg, Method and System for Evaluating Quality of Deghosted Seismic Data, U.S. Pat. No. 6,654,694 issued Nov. 25, 2003; and J. T. Fokkema and P. M. van den Berg, Method and System for Deghosting, U.S. Pat. No. 6,747,913, issued Jun. 8, 2004.

SUMMARY OF THE INVENTION

One aspect of the invention is a method for deghosting and water surface multiple reflection attenuation in marine seismic data. The method includes decomposing seismic data acquired using sensors measuring the same parameter at two water depths into upgoing and downgoing wavefield components, the upgoing wavefield component being a deghosted wavefield, and determining a substantially multiple-free wavefield from the decomposed wavefield components, independently of knowledge of the source wavelet.

One aspect of the invention is a method for deghosting and water surface multiple reflection attenuation in marine seismic data. The method includes decomposing data acquired at a plurality of source positions at two water depths with sensors that measure the same parameter into upgoing and downgoing wavefield components, said upgoing wavefield component being a deghosted wavefield. The decomposing, in one embodiment, includes transforming the data from the spatial domain into the spatial Fourier domain and separating the upgoing and downgoing wavefield components in the transformed data. A substantially multiple-free wavefield is then determined from the decomposed wavefield components independently of knowledge of the source wavelet. In one embodiment, the substantially multiple-free wavefield is determined by solving a system of equations for a vertical velocity component of a reflected wavefield in the water for a plurality of different seismic energy source positions.

Another aspect of the invention is a computer program stored in a computer readable medium. The program includes logic operable to cause a programmable computer to perform the following steps. First, marine seismic data acquired at a plurality of source positions at two water depths with sensors that measure the same parameter are decomposed into upgoing and downgoing wavefield components, said upgoing wavefield component being a deghosted wavefield. The decomposing includes, in one embodiment, transforming the data into the spatial Fourier domain and separating the upgoing and downgoing wavefield components in the transformed data. The steps in the program include determining a substantially multiple-free wavefield from the decomposed wavefield components independently of knowledge of the source wavelet.

Other aspects and advantages of the invention will be apparent from the following description and the appended claims.

DETAILED DESCRIPTION

Particular embodiments of the invention are described below in terms of a two-dimensional seismic survey, meaning that a seismic energy source, and seismic receivers, are substantially in a vertical plane. It should be clearly understood that the following description is only for the purpose of explaining the principles by which methods according to the invention work, and seismic data acquisition in three dimensions is intended to be within the scope of this invention.

Figure 1:
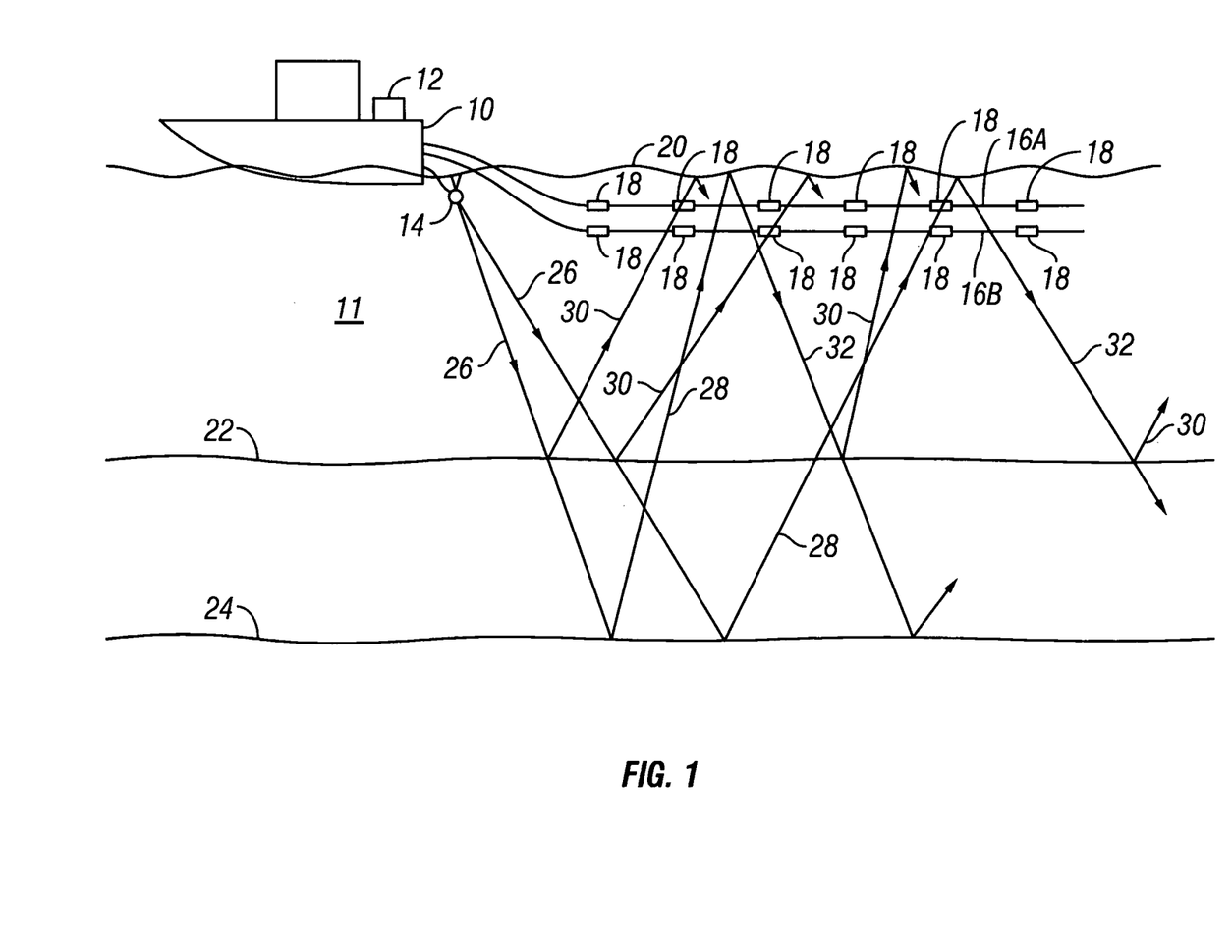
FIG. 1 shows a marine seismic acquisition system for acquiring seismic data for use with embodiments of a method according to the invention.

An example technique for acquiring seismic data that can be used with seismic data processing methods according to the invention is shown in FIG. 1. The example in FIG. 1 is two-dimensional, meaning that the technique is related to data acquired using two seismic sensor cables (called "streamers") 16A, 16B each towed at a different selected depth below the surface 20 of the body of water 11. A two-dimensional representation of methods according to the invention is only meant to show the principle of the invention and is not intended to limit the scope of the invention. Methods of data processing according to the invention can also be used with three-dimensional acquisition techniques, in which a plurality of laterally spaced apart seismic sources and/or streamer pairs are used to acquire seismic data representative of a selected subsurface area.

Although a preferred embodiment of the invention is described with reference to data being acquired by sensors included in streamer cables towed behind a vessel, the data may also be acquired by sensors that are at stationary locations within the water, which may be on or near the seafloor. Further, a preferred embodiment of the invention is described with reference to sensors that measure a parameter related to pressure, such as hydrophones, but the invention may also be performed with sensors that measure particle motion, such as geophones or accelerometers, rather than pressure sensors.

In FIG. 1, a seismic vessel 10 includes navigation, seismic source control and recording equipment (referred to for convenience hereinafter as the "recording system") of types well known in the art and shown generally at 12. The recording system 12 causes a seismic energy source 14 towed in the body of water 11 (such as a lake or the ocean) to actuate at selected times. The source 14 may be any type well known in the art, including an air gun, a water gun or arrays of such guns. The actual seismic energy source used is not intended to limit the scope of the invention.

In a preferred embodiment, each streamer 16A, 16B includes pressure-responsive sensors 18 at spaced apart positions along the streamer 16A, 16B. Each sensor 18 is responsive to the pressure in the water 11 or to changes in pressure such as change in pressure with respect to time. As is well known in the art, the pressure sensor may be a hydrophone. The exact type of each of the sensors 18 actually used in any acquisition system is not intended to limit the scope of the invention.

In an alternative embodiment, each streamer 16A, 16B includes sensors 18 responsive to particle motion of the water, rather than pressure. As is well known in the art, the motion responsive sensor may be an accelerometer or a geophone. For purposes of this alternative embodiment, it is only necessary to be able to determine a vertical component of the particle motion, at each particle motion sensor. The type of each sensor actually used in any acquisition system is not intended to limit the scope of the invention. For illustrative purposes only, the invention will be described in the case of pressure sensors.

When the source 14 is actuated, acoustic (seismic) energy travels outwardly from the source 14. The downwardly traveling energy, shown generally at 26, will include energy emanating directly from the source as well as energy reflected from the water surface (the "source ghost"). Some of the downwardly traveling energy penetrates the water bottom 22 and reaches a subsurface layer boundary 24. Seismic energy is reflected from the layer boundary 24, whereupon the reflected energy travels upwardly, at 28. The upwardly traveling seismic energy is detected by the sensors 18 on streamers 16A and 16B. The upwardly traveling energy 28 ultimately reaches the water surface 20, whereupon the energy is reflected and travels downwardly again, as shown at 32. The water surface reflected energy 32 is detected by the sensors 18, resulting in a "ghost" signal. The water surface reflected energy 32 also may be reflected from the water bottom 22, and becomes upwardly traveling energy, shown generally at 30. Some of the energy emanating directly from the source 14 will also be reflected from the water bottom 22 and becomes part of the energy reflected from the water bottom, as shown at 30. Also, as explained in the Background section herein, seismic energy will reflect from the water surface (downgoing energy 32) and will again reflect from the water bottom (upgoing energy 30) a plurality of times, resulting in water-layer multiple reflections.

As a result of the seismic energy reflections, the seismic energy detected by the sensors 18, referred to as a "total wavefield" (and further defined below), includes both upwardly traveling energy ("upgoing wavefield") and downwardly traveling energy ("downgoing wavefield"). The upgoing and downgoing wavefields include components resulting from subsurface reflectors, such as boundary 24, and from water surface and water bottom reflections.

Figure 2:
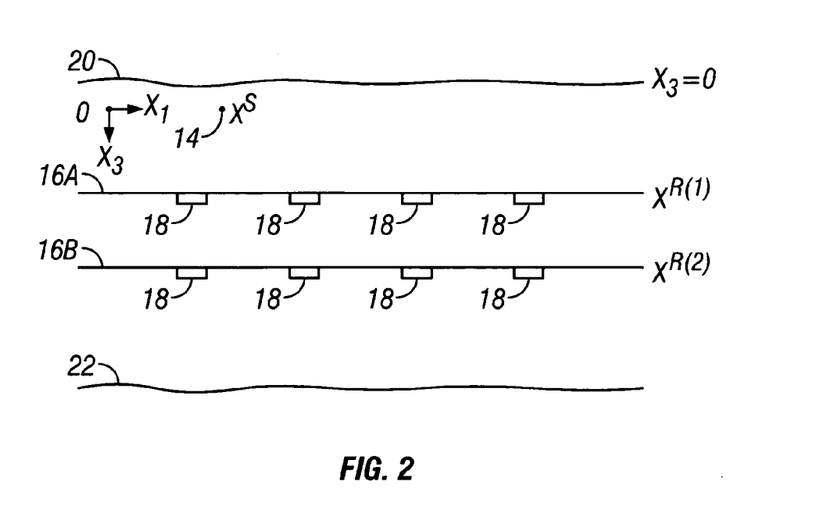
FIG. 2 shows a coordinate system used in explaining embodiments of a method according to the invention.

FIG. 2 shows a coordinate system that will be used in the following explanation of signal processing methods according to the invention. The coordinate system may include an arbitrarily selected origin, shown at O. Position with respect to the origin O of any other point in the coordinate system can be defined as a horizontal coordinate $x_1$ and a vertical coordinate $x_3$. For convenience, coordinates of a point can be represented by the vector notation x. Position of the source (14 in FIG. 1) is represented by the notation $x^S$, and position of each of the sensors is represented by the notation $x^{R(1)}$ for the shallower running streamer 16A and $x^{R(2)}$ for the deeper running streamer 16B.

During acquisition of seismic data, the seismic energy source (14 in FIG. 1) is actuated at selected times. Actuation of the source results in acoustic (seismic) energy traveling outwardly from the source in all directions. The seismic energy causes changes in pressure in the water, and changes in particle velocity of the water that may be represented mathematically as follows. The pressure and particle velocity change with respect to time, in relation to propagation characteristics of the water, the formations below the water bottom, and energy characteristics of the seismic energy source. The time-dependent pressures and time-dependent particle velocities (in all spatial directions) at any spatial position is commonly known as the "wavefield." The wavefield may be denoted as $\{\hat{p}(x,s),\hat{v}_k(x,s)\}$ in the spatial-frequency domain (where the frequency parameter $s=j\omega$, that is, the product of the complex conjugate square root of −1 and the angular frequency of the seismic energy). In the foregoing expression, $\hat{p}$ denotes the acoustic pressure and $\hat{v}_k=\{\hat{v}_1,\hat{v}_3\}$ denotes the particle velocity in the horizontal and vertical directions, respectively. The spatial position parameter x in two dimensions is denoted as $x=\{x_1,x_3\}$. The wavefield is generated by the seismic energy source (14 in FIG. 1) located at a position denoted by $x^S=\{x_1^S,x_3^S\}$.

In a method according to the invention, the seismic wavefield pressure is measured at two, different selected depths below the water surface. The water surface is designated by having the vertical position parameter equal to zero ($x_3=0$). As previously explained, the measured total wavefield will include both seismic energy waves reflected by the acoustic impedance boundaries (24 in FIG. 1) below the water bottom (22 in FIG. 1) and the seismic energy waves reflected by the water bottom and the water surface. In the present embodiment, the seismic wavefield is measured using the two streamers (16A, 16B in FIG. 1) each disposed at a different selected depth below the water surface. The seismic sensors (18 in FIG. 1) are located at positions denoted by $x^R=(x_1,x_3^{R(1)})$ and at $x^R=(x_1,x_3^{R(2)})$ respectively. In the present analysis, it is assumed that the sensor depth levels are below the seismic source depth level, implying that $x_3^{R(2)}>x_3^{R(1)}>x_3^S$ (see FIG. 2). It is assumed that the water between the streamers and the water surface is substantially homogeneous, and has a density represented by $\rho$ and a compressibility represented by $\kappa$. The wave speed in the water can be determined by the expression $c=(\kappa\rho)^{-1/2}$.

For convenience, the spatial Fourier transform is utilized to transform data in the horizontal coordinate into the spatial Fourier domain. The spatial Fourier transform is defined as:

$$\bar{u}(js\alpha_1, x_3, s) = \int_{x_1 \in R} \exp(js\alpha_1 x_1)\hat{u}(x_1, x_3, s)dA, \qquad (1)$$

$$\hat{u}(x_1, x_3, s) = \frac{1}{2\pi}\int_{s\alpha_1 \in R} \exp(-js\alpha_1 x_1)\bar{u}(x_1, x_3, s)dA. \qquad (2)$$

The total pressure wavefield can be decomposed into downgoing and upgoing components which may be expressed as shown below:

$$\hat{p}(x_1,x_3,s)=\hat{p}^{down}(x_1,x_3,s)+\hat{p}^{up}(x_1,x_3,s). \tag{3}$$

In the present embodiment, the decomposition of the total pressure wavefield is carried out in the spatial Fourier domain, where the downgoing and upgoing spectral counterparts have propagation properties described by:

$$\bar{p}^{down}(js\alpha_1,x_3,s)=\bar{P}^{down}(js\alpha_1,s)\exp(-s\Gamma x_3) \tag{4}$$

and $$\bar{p}^{up}(js\alpha_1,x_3,s)=\bar{P}^{up}(js\alpha_1,s)\exp(s\Gamma x_3), \tag{5}$$

in which $$\Gamma=\left(\frac{1}{c^2}+\alpha_1^2\right)^{\frac{1}{2}}, \quad \text{Re}(\Gamma)>0, \tag{6}$$

in which $\alpha_1$ represents the horizontal component of the angular slowness vector, and as shown in equation (6), the real part of the quantity $\Gamma$ is a positive number. In the spatial Fourier domain, the vertical component of the particle velocity and the acoustic pressure of the downgoing wavefield at a particular measurement depth are related to each other by the expression:

$$\rho\bar{v}_3^{down}(js\alpha_1,x_3,s)-\Gamma\bar{p}^{down}(js\alpha_1,x_3,s)=0. \tag{7}$$

Similarly, the vertical component of the particle velocity and the acoustic pressure of the upgoing wavefield are related to each other as:

$$\rho\bar{v}_3^{up}(js\alpha_1,x_3,s)+\Gamma\bar{p}^{up}(js\alpha_1,x_3,s)=0. \tag{8}$$

Note the downgoing pressure wavefield $\bar{p}^{down}$ includes the wavefield emanating directly from the source and its source ghost (the "source ghost" being the wavefield reflected from the water surface proximate the source, having propagated from the source directly to the water surface). The wavefield from the source and its ghost is denoted as the "incident" wavefield. Because both streamers (16A, 16B in FIG. 1) are located deeper than the depth of the seismic energy source (14 in FIG. 1), the incident wavefield at the sensor locations is downgoing. The acoustic pressure of the incident wavefield is denoted as $\bar{p}^{inc,H}$. The downgoing wavefield is written as a superposition of the foregoing incident wavefield and a scattered, downgoing component wavefield $\hat{p}^{sct,down}$ by the expression:

$$\hat{p}^{down}=\hat{p}^{inc,H}+\hat{p}^{sct,down}, \quad x_3>x_3^S, \tag{9}$$

in which the observation (measurement) depth is below the depth of the seismic energy source. The "scattered" wavefield is the wavefield that reaches the water surface after being reflected from the subsurface reflecting layers 26 and the water bottom and is reflected downwardly from the water surface. If it is assumed that the sea surface is a substantially perfectly reflecting plane at $x_3=0$, it can be observed that the total pressure wavefield vanishes at the sea surface, thus providing the expression:

$$\hat{p}^{up}(x_1,0,s)+\hat{p}^{down}(x_1,0,s)=0. \tag{10}$$

Because the incident wavefield $\bar{p}^{inc,H}$ also vanishes at the sea surface, it can be observed that, in view of equation (9) the following expression is true:

$$\bar{p}^{up}(js\alpha_1,0,s)+\bar{p}^{sct,down}(js\alpha_1,0,s)=0. \tag{11}$$

Taking equations (4) and (5), into account, that is, taking into account the propagation properties of the seismic energy, the following relationship between the upgoing wavefield and downgoing scattered wavefield can be derived:

$$\bar{p}^{sct,down}(js\alpha_1,x_3,s)=-\exp(-2s\Gamma x_3)\bar{p}^{up}(js\alpha_1,x_3,s). \tag{12}$$

Using equations (9) and (12), it can be observed that at the two different sensor depth levels, the following relationships hold:

$$\bar{p}(js\alpha_1,x_3^{R(1)},s)= \\ \bar{p}^{inc,H}(js\alpha_1,x_3^{R(1)},s)+[1-\exp(-2s\Gamma x_3^{R(1)})] \\ \bar{p}^{up}(js\alpha_1,x_3^{R(1)},s), \tag{13}$$

$$\bar{p}(js\alpha_1,x_3^{R(2)},s)= \\ \bar{p}^{inc,H}(js\alpha_1,x_3^{R(2)},s)+[1-\exp(-2s\Gamma x_3^{R(2)})] \\ \bar{p}^{up}(js\alpha_1,x_3^{R(2)},s). \tag{14}$$

Since $\bar{p}^{inc,H}$ is a downgoing wavefield and $\bar{p}^{up}$ is an upgoing wavefield at the sensor depth levels, the right-hand sides of equations (13) and (14) can be rewritten by propagating the incident wavefield and the upgoing scattered wavefield from the seismic sensor depth level at $x_3^{R(1)}$ to the seismic sensor level at $x_3^{R(2)}$. Defining the factors:

$$f_1=[1-\exp(-2s\Gamma x_3^{R(1)})]\exp(-s\Gamma d) \tag{15}$$

and $$f_2=1-\exp(-2s\Gamma x_3^{R(2)}), \tag{16}$$

in which $$d=x_3^{R(2)}-x_3^{R(1)} \tag{17}$$

represents the vertical separation between the two sensor depth levels, the following two equations may be derived for the acoustic pressure at each sensor depth level:

$$\bar{p}(js\alpha_1,x_3^{R(1)},s)=\exp(s\Gamma d)\bar{p}^{inc,H}(js\alpha_1,x_3^{R(2)},s)+f_1 \\ \bar{p}^{up}(js\alpha_1,x_3^{R(2)},s), \tag{18}$$

$$\bar{p}(js\alpha_1,x_3^{R(2)},s)=\bar{p}^{inc,H}(js\alpha_1,x_3^{R(2)},s)+f_2 \\ \bar{p}^{up}(js\alpha_1,x_3^{R(2)},s) \tag{19}$$

for the two unknowns wavefields $\bar{p}^{inc,H}(js\alpha_1,x_3^{R(2)},s)$ and $\bar{p}^{up}(js\alpha_1,x_3^{R(2)},s)$.

After solution, the deghosted wavefield may be determined by the expression:

$$\bar{p}^{up}(js\alpha_1,x_3^{R(2)},s)=\frac{\exp(s\Gamma d)\bar{p}(js\alpha_1,x_3^{R(2)},s)-\bar{p}(js\alpha_1,x_3^{R(1)},s)}{2\sinh(s\Gamma d)}. \tag{20}$$

If the vertical separation between the two sensor depth levels is sufficiently small, the zero of the denominator of the right-hand side of equation (20) lies outside the frequency spectrum of the seismic signals, irrespective of the depths of the individual sensor.

Note that $\bar{p}^{up}$ represents the upgoing pressure wavefield from the earth geology, and is obtained from the two measured pressure wavefields at two sensor depth levels in the water. In fact, equation (20) is the spatial Fourier transform of the deghosted wavefield. An inverse of the spatial Fourier transform can be used to determine the deghosted wavefield.

A second feature of using two, depth spaced seismic sensor cables, is that it makes possible determining the incident wavefield at the seismic sensor depth levels as well. By eliminating the terms with the upgoing wavefields from equations (18) and (19), the incident wavefield can be obtained by the expression:

$$\overline{p}^{inc,H}(js\alpha_1, x_3^{R(2)}, s) = \frac{-f_1 \overline{p}(js\alpha_1, x_3^{R(2)}, s) + f_2 \overline{p}(js\alpha_1, x_3^{R(1)}, s)}{2\sinh(s\Gamma d)}. \quad (21)$$

Moreover, if it is assumed that the incident wavefield is generated by a "point" source (a source occupying essentially zero spatial volume) located at position $x=x^S$, the incident wavefield (which includes the source ghost) can be determined in the spatial Fourier domain by the expression:

$$\overline{p}^{inc,H}(js\alpha_1, x_3^{R(2)}, s) = \hat{W}^S(s) \exp\left(\frac{js\alpha_1 x_1^s - }{s\Gamma x_3^{R(2)}}\right) \frac{\sinh(s\Gamma x_3^s)}{s\Gamma}, \quad (22)$$

where $\hat{W}^S(s)$ represents the source wavelet in the frequency domain. Equations (21) and (22) enable determining the source wavelet from the incident wavefield. A robust manner for determining the source wavelet is to minimize the least-square differences between the right-hand sides of equations. (21) and (22), for all values of $\alpha_1$.

A next processing step is to remove the multiple reflections related to the water surface. The knowledge of the upgoing and downgoing wavefield, together with the source wavelet, can be used in standard multiple removal procedures. However, it can be shown that knowledge of the source including the source wavelet is not required for a water top multiple reflection removal procedure. To explain this principle, first will be explained the "propagation invariant" that follows from the field reciprocity theorem.

The propagation invariant at the second sensor depth level $x_3=x_3^{R(2)}$ that follows is from the reciprocity theorem. See, for example Section 4.2.2 of, J. W. Schoolmeesters, *Three-dimensional processing of marine seismic data by spectral decomposition*, Ph.D. Thesis, Delft University of Technology, 7 Jun. 2001. In the two-dimensional notation used throughout this description, the propagation invariant at the depth level of the lower streamer (16B in FIG. 1), denoted $x_3=x_3^{R(2)}$, is given by the expression:

$$\frac{1}{2\pi} \int_{s\alpha_1 \in \mathbb{R}} \left[ \begin{array}{c} \overline{p}^A(js\alpha_1, x_3, s)\overline{v}_3^B(-js\alpha_1, x_3, s) - \\ \overline{p}^B(-js\alpha_1, x_3, s)\overline{v}_3^A(js\alpha_1, x_3, s) \end{array} \right] dA = 0, \quad (23)$$

in which $\{\overline{p}^A, \overline{v}_3^A\}$ and $\{\overline{p}^B, \overline{v}_3^B\}$ are two possible acoustic states. Writing each of the possible acoustic states, A and B, as a superposition of upgoing and downgoing wavefields, that is:

$$\overline{p}^A = \overline{p}^{A,up} + \overline{p}^{A,down} \text{ and } \overline{p}^B = \overline{p}^{B,up} + \overline{p}^{B,down}, \quad (24)$$

and noting that only oppositely propagating waves contribute, equation (23) becomes:

$$\frac{1}{2\pi} \int_{s\alpha_1 \in \mathbb{R}} \left[ \begin{array}{c} \overline{p}^{A,up}(js\alpha_1, x_3, s)\overline{v}_3^{B,down}(-js\alpha_1, x_3, s) - \\ \overline{p}^{B,down}(-js\alpha_1, x_3, s)\overline{v}_3^{A,up}(js\alpha_1, x_3, s) + \\ \overline{p}^{A,down}(js\alpha_1, x_3, s)\overline{v}_3^{B,up}(-js\alpha_1, x_3, s) - \\ \overline{p}^{B,up}(-js\alpha_1, x_3, s)\overline{v}_3^{A,down}(js\alpha_1, x_3, s) \end{array} \right] dA = 0. \quad (25)$$

Using the relationship for the upgoing wavefield in equation (8), and for the downgoing wavefield in equation (7), in the above matrix of equation (25) the second term can be combined with the first term, and the third term can be combined with the fourth term in the left-hand side to provide the expression:

$$\frac{1}{2\pi} \int_{s\alpha_1 \in \mathbb{R}} \left[ \begin{array}{c} \overline{p}^{A,up}(js\alpha_1, x_3, s)\overline{v}_3^{B,down}(-js\alpha_1, x_3, s) - \\ \overline{p}^{B,up}(-js\alpha_1, x_3, s)\overline{v}_3^{A,down}(js\alpha_1, x_3, s) \end{array} \right] dA = 0. \quad (26)$$

This is the propagation invariant for upgoing and downgoing wavefields. Further, because:

$$\overline{p}^{A,up}(js\alpha_1, x_3, s) = -(\rho/\Gamma)\overline{v}_3^{A,up}(js\alpha_1, x_3, s), \quad (27)$$

and $$\overline{v}_3^{B,down}(-js\alpha_1, x_3, s) = (\Gamma/\rho)\overline{p}^{B,down}(-js\alpha_1, x_3, s), \quad (28)$$

the propagation invariant of equation (26) may also be written as:

$$\frac{1}{2\pi} \int_{s\alpha_1 \in \mathbb{R}} \left[ \begin{array}{c} \overline{v}_3^{A,up}(js\alpha_1, x_3, s)\overline{p}^{B,down}(-js\alpha_1, x_3, s) + \\ p^{B,up}(-js\alpha_1, x_3, s)\overline{v}_3^{A,down}(js\alpha_1, x_3, s) \end{array} \right] dA = 0. \quad (29)$$

The version of the propagation invariant in equation (29) is the basis for attenuation of water layer multiple reflections which will be explained below.

In an exemplary water layer multiple attenuation procedure, let State A be the desired multiple-free wavefield, represented by $\{\hat{p}^r, \hat{v}_3^r\}$ and denoted as the "reflected" wavefield. This is the wavefield that would occur in the absence of the water surface (20 in FIG. 1) and which at the sensor depth level (measurement depth) is upgoing. The incident wavefield that generates such a reflected wavefield is denoted as $\{\hat{p}^{inc}, \hat{v}_3^{inc}\}$. The incident wavefield at the sensor depth level is downgoing. State B represents the actual (measured) wavefield, including water layer multiples, and has an upgoing wavefield component represented by $\{\hat{p}^{up}, \hat{v}_3^{up}\}$ and a downgoing wavefield component represented by $\{\hat{p}^{down}, \hat{v}_3^{down}\}$. Substituting states A and B into equation (29) provides the expression:

$$\frac{1}{2\pi} \int_{s\alpha_1 \in \mathbb{R}} \left[ \begin{array}{c} \overline{v}_3^r(js\alpha_1, x_3, s)\overline{p}^{down}(-js\alpha_1, x_3, s) + \\ \overline{p}^{up}(-js\alpha_1, x_3, s)\overline{v}_3^{inc}(js\alpha_1, x_3, s) \end{array} \right] dA = 0, \quad (30)$$

when the sensor depth is the deeper level, at streamer 16B, represented by $x_3=x_3^{R(2)}$. The propagation invariant holds for any incident wavefield $\hat{p}^{inc}$ that generates a reflected wavefield $\hat{p}^r$. A consequence is that it becomes possible to choose a source and a wavelet. The multiple attenuation procedure should then lead to the multiple-free wavefield $\{\hat{p}^r, \hat{v}_3^r\}$. Therefore, it is advantageous to take a point source at $x^{Sr}$ with a given desired wavelet $\hat{W}^{Sr}(s)$, so that:

$$s\rho v_3^{inc}(js\alpha_1, x_3, s) = \frac{1}{2}\hat{W}^{Sr}(s)\exp\left[\frac{js\alpha_1 x_1^{Sr} - }{s\Gamma(x_3 - x_3^{Sr})}\right], \quad x_3 > x_3^{Sr}. \quad (31)$$

To make the removal procedure practical, the propagation invariant is considered in the spatial domain. Using Parseval's theorem, equation (30) becomes:

$$\int_{x_1 \in R} \left[ \begin{array}{c} \hat{v}_3^r(x_1,x_3,s)\hat{p}^{down}(x_1,x_3,s) + \\ \hat{p}^{up}(x_1,x_3,s)\hat{v}_3^{inc}(x_1,x_3,s) \end{array} \right] dA = 0, \quad (32)$$

where $x_3 = x_3^{R(2)}$. In order to indicate the different source positions $x^S$ of the actual wavefield and $x^{Sr}$ of the desired multiple-free wavefield, the propagation invariant can be rewritten as:

$$\int_{x_1 \in R} \hat{v}_3^r(x|x^{Sr},s)\hat{p}^{down}(x|x^S,s)dA = \\ -\int_{x_1 \in R} \hat{p}^{up}(x|x^S,s)\hat{v}_3^{inc}(x|x^{Sr},s)dA, \quad (33)$$

$$x_3 = x_3^{R(2)}.$$

The right-hand side of equation (33) is known, because $\hat{p}^{up}$ is known from equation (20), and $\hat{v}_3^{inc}$ follows from the chosen incident wavefield, such as from equation (31). In the left-hand side of equation (33), $\hat{p}^{down}$ is known from equations (3) and (20), while $\hat{v}_3^r$ represents vertical velocity component of the to-be-determined, multiple-free, reflected wavefield. In order to obtain a system of equations to solve for the unknown vertical velocity component of the reflected wavefield, equation (33) may be determined for a plurality of source positions $x^S$ for each particular set of sensor positions $x^R$.

Note that $\hat{p}^{down}$ can be obtained from the total pressure wavefield and the deghosted pressure wavefield by the expression:

$$\hat{p}^{down}(x_1,x_3^{R(2)},s) = \hat{p}(x_1,x_3^{R(2)},s) - \hat{p}^{up}(x_1,x_3^{R(2)},s). \quad (34)$$

When the particle velocity $\hat{v}_3^r$ of the desired wavefield has been solved from equation (33), the pressure wavefield follows from the following relation in the spatial Fourier domain:

$$\tilde{p}^r(j s\alpha_1, x_3^{R(2)}|x^{Sr},s) = -(\rho/\Gamma)\tilde{v}_3^r(j s\alpha_1, x_3^{R(2)}|x^{Sr},s). \quad (35)$$

When a point source is used as a source for the desired wavefield, the right-hand side of equation (33) is transformed to the spatial Fourier domain by using Parseval's theorem, and equation (31) can be substituted. After transformation from the spatial Fourier domain back to the spatial-frequency domain, the result is:

$$\int_{x_1 \in R} s\rho\hat{v}_3^r(x|x^{Sr},s)\hat{p}^{down}(x|x^S,s)dA = -\frac{1}{2}\hat{W}^{Sr}(s)\hat{p}^{up}(x^{Sr}|x^S,s), \quad (36)$$

$$x_3 = x_3^{R(2)}.$$

Although equations (33) and (36) are formulated in the spatial-frequency domain, they may be formulated in the spatial Fourier-frequency domain as well. Instead of being formulated in the frequency domain, they can also be formulated in the time domain, advantageously. The choice of these domains of operation is a matter of discretion of a designer of methods and computer programs according to the invention and is not intended to limit the scope of the invention.

Figure 3:
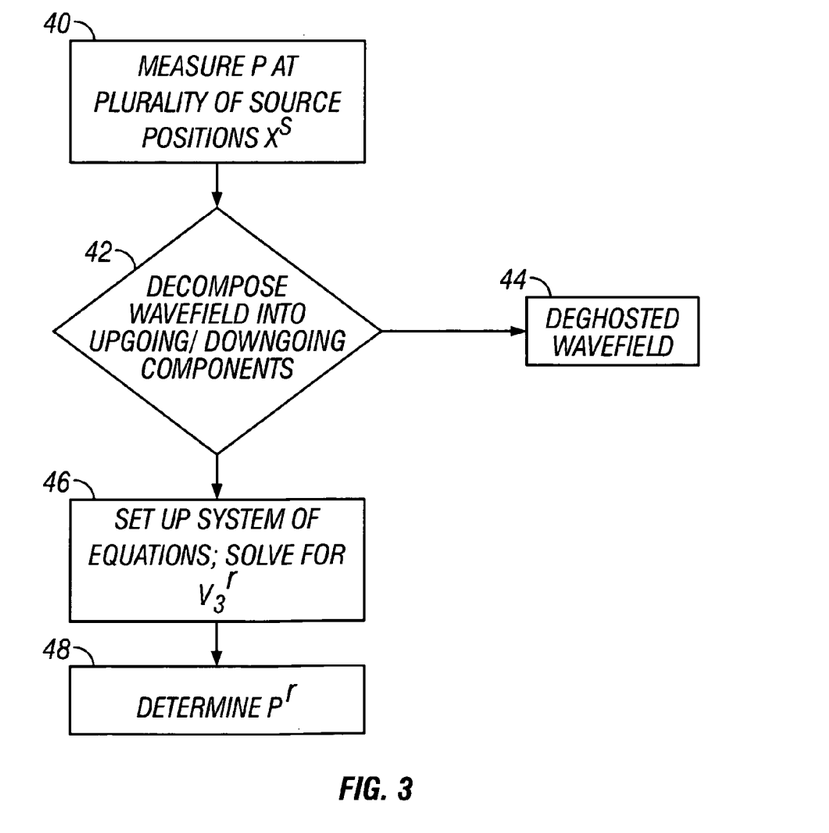
FIG. 3 is a flow chart of an example embodiment of the invention.

A processing sequence according to one embodiment of the invention in can be summarized as follows with reference to FIG. 3.

At 40, the source (14 in FIG. 1) is actuated and measurements are made of the total acoustic pressure, $\hat{p}(x^{R(1)}|x^S,s)$, at the upper sensor depth (at the shallower depth) and the total acoustic pressure, $\hat{p}(x^{R(2)}|x^S,s)$, at the lower (deeper) sensor depth, where $x^S$ represents the source position. The source position may be, for example, the midpoint of a source array (where an array of sources is used), while $x^{R(1)}$ and $x^{R(2)}$ are the positions of the sensors on the upper sensor streamer (16A in FIG. 1) and lower sensor streamer (16B in FIG. 1), respectively. Pressure data acquisition is repeated at a plurality of source positions $x^S$.

In an alternative embodiment, the lower sensor streamer may be replaced by an ocean bottom cable. In a particular implementation of this embodiment, both cables could be stationary rather than towed. The lower cable could be resting on the ocean bottom, while the upper cable could be tethered in place at a fixed distance above the lower cable. The upper cable could be attached to the lower cable by the tethers.

At 42, the measured wavefield pressure data are decomposed into upgoing wavefields, $\hat{p}^{up}(x^{R(2)}|x^S,s)$ using equation (20) and downgoing wavefields $\hat{p}^{down}(x^{R(2)}|x^S,s)$ using equation (34). Note that the spatial Fourier transform is used to transform the upgoing wavefield from the spatial domain into the spatial Fourier domain as used in equation (20). The upgoing wavefield $\hat{p}(x^{R(2)}|x^S,s)$ represents the deghosted wavefield, as shown at 44. This processing step may be carried out for each source position $x^S$ separately.

Then, multiple reflection attenuation is performed by, at 46, setting up and solving a system of equations (the discrete case of equation (36)) for a plurality of different source positions. The known variables are the upgoing and downgoing pressure wavefields solved at 42 and the chosen source wavelet. The resulting solution $\hat{v}_3^r$ yields the particle velocity of the desired multiple-free wavefield. The related pressure wavefield is obtained, at 48, using the spatial Fourier transform and equation (35).

In an alternative embodiment, the sensors may be vertical particle motion sensors instead of pressure sensors. The relation between vertical particle motion and pressure, given by equations (7) and (8) for the downgoing an upgoing components, respectively, of the wavefield, allows the system of equations (the discrete case of equation 36 discussed above) to be set up to solve for pressure in terms of measured vertical particle velocity.

Advantageously, the invention provides a method for deghosting and water surface multiple removal which is substantially independent of knowledge of the source wavelet, the water surface geometry and the depth of seismic sensors in the water. Therefore, corrections for undulation of the water surface are not needed, and it is unnecessary to determine the source wavelet using methods according to the invention.

Figure 4:
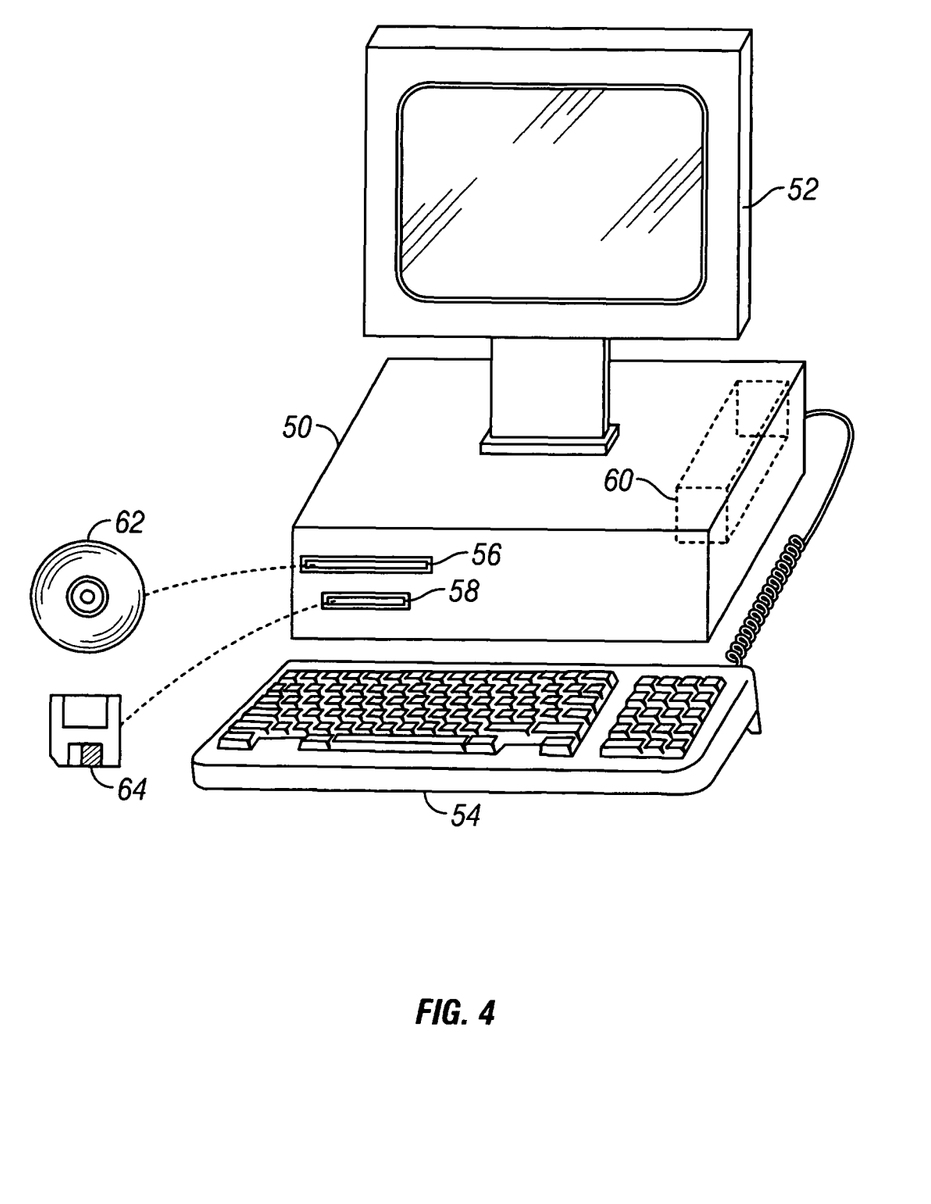
FIG. 4 shows a programmable computer adapted to read a program from a computer readable medium.

The foregoing embodiments of methods according to the various aspects of the invention may be performed by a suitably programmed general purpose computer. An example of such a computer is shown in FIG. 4 having a central processor 50. The processor 50 is coupled to a user input device 54 such as a keyboard, and is coupled to a display 52 such as a cathode ray tube (CRT) or flat panel liquid crystal display (LCD). A computer program according to this aspect of the invention may reside on any one of a number of types of computer readable medium, such as compact disk 62 insertable into a CD reader 56, magnetic "floppy" disk 64 insertable into a floppy disk drive 58, or the program may reside in a hard drive 60 within or remote from the processor 50. The program includes logic operable to cause a programmable computer to perform the data processing sequences described above with respect to FIGS. 1-3. The particular embodiment in which a computer program is stored is not meant to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for converting marine seismic data into a water surface multiple reflection attenuated pressure wavefield, comprising:

using a programmable computer to perform the following:
decomposing seismic data representative of structures and composition of subsurface earth formations acquired using pressure sensors that generate signals in response to seismic energy at two different water depths over the location of the subsurface earth formations into upgoing and downgoing pressure wavefield components;
determining a substantially multiple-free vertical particle velocity wavefield by solving a system of equations based on the upgoing and downgoing pressure wavefield components at a plurality of seismic source positions; and
determining a substantially multiple-free pressure wavefield from the substantially multiple-free vertical particle velocity wavefield.

2. The method of claim 1, wherein the decomposing comprises transforming the data into the spatial Fourier domain and separating the upgoing and downgoing pressure wavefield components in the transformed data.

3. The method of claim 1, wherein the data are acquired using a towed streamer at each of the two depths.

4. The method of claim 1, wherein the data are acquired using an ocean bottom cable at one of the two depths.

5. The method of claim 4, wherein the data are acquired using an ocean bottom cable at one of the two depths and a stationary streamer tethered to the ocean bottom cable at the other of the two depths.

6. The method of claim 1, wherein the two depths are below a depth of a seismic energy source.

7. A method for converting marine seismic data into a water surface multiple reflection attenuated vertical particle velocity wavefield, comprising:

using a programmable computer to perform the following:
decomposing seismic data representative of structures and composition of subsurface earth formations, acquired using particle motion sensors that generate signals in response to seismic energy at two different water depths over the location of the subsurface earth formations, into upgoing and downgoing vertical particle velocity wavefield components;
determining a substantially multiple-free pressure wavefield by solving a system of equations based on the upgoing and downgoing vertical particle velocity wavefield components at a plurality of seismic source positions; and
determining a substantially multiple-free vertical particle velocity wavefield from the substantially multiple-free pressure wavefield.

8. The method of claim 7, wherein the particle motion sensor is a particle velocity sensor.

9. The method of claim 7, wherein the particle motion sensor is a particle acceleration sensor.

10. The method of claim 7, wherein the decomposing comprises transforming the data into the spatial Fourier domain and separating the upgoing and downgoing vertical particle velocity wavefield components in the transformed data.

11. The method of claim 7, wherein the data are acquired using a towed streamer at each of the two depths.

12. The method of claim 7, wherein the data are acquired using an ocean bottom cable at one of the two depths.

13. The method of claim 12, wherein the data are acquired using an ocean bottom cable at one of the two depths and a stationary streamer tethered to the ocean bottom cable at the other of the two depths.

14. The method of claim 7, wherein the two depths are below a depth of a seismic energy source.

\* \* \* \* \*